United States Patent
Matsuba et al.

(10) Patent No.: US 12,491,586 B2
(45) Date of Patent: Dec. 9, 2025

(54) WELDED JOINT

(71) Applicant: NIPPON STEEL CORPORATION, Tokyo (JP)

(72) Inventors: Masahiro Matsuba, Tokyo (JP); Takuya Mitsunobu, Tokyo (JP); Masaaki Uranaka, Tokyo (JP); Toyomitsu Nakamura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/725,477

(22) PCT Filed: Jan. 26, 2023

(86) PCT No.: PCT/JP2023/002440
§ 371 (c)(1),
(2) Date: Jun. 28, 2024

(87) PCT Pub. No.: WO2023/145823
PCT Pub. Date: Aug. 3, 2023

(65) Prior Publication Data
US 2025/0065450 A1    Feb. 27, 2025

(30) Foreign Application Priority Data

Jan. 31, 2022  (JP) ................. 2022-013461

(51) Int. Cl.
*B23K 35/30* (2006.01)
*B23K 9/23* (2006.01)
(Continued)

(52) U.S. Cl.
CPC ............ *B23K 35/3073* (2013.01); *B23K 9/23* (2013.01); *B23K 26/322* (2013.01);
(Continued)

(58) Field of Classification Search
CPC .... B23K 35/3073; B23K 9/23; B23K 26/322; B23K 35/288; B23K 2103/04; B23K 2103/166
(Continued)

(56) References Cited

U.S. PATENT DOCUMENTS

| | | | |
|---|---|---|---|
| 2019/0210166 A1* | 7/2019 | Ishizaki | ................ C22C 38/002 |
| 2020/0002798 A1 | 1/2020 | Tokuda et al. | |

FOREIGN PATENT DOCUMENTS

WO    WO-2018139620 A1 *    8/2018   ............. C22C 18/04

* cited by examiner

*Primary Examiner* — Steven W Crabb
*Assistant Examiner* — Dilnessa B Belay
(74) *Attorney, Agent, or Firm* — Birch, Stewart, Kolasch & Birch, LLP

(57) ABSTRACT

To further improve electrodeposition coating properties in a weld bead zone.

A welded joint according to the present invention includes: a first steel sheet and a second steel sheet; and a weld bead zone formed by arc welding or laser welding, wherein at least one of the first steel sheet or the second steel sheet has a plating layer composed of a predetermined component and an oxide layer located on the plating layer in a non-heat-affected zone, and the weld bead zone has a weld metal and a slag layer formed on part of a surface of the weld metal, and the slag layer contains, by mass % when oxygen is excluded, Al: 1.0 to 45.0% and Mg: 1.0 to 30.0%, with the balance composed of Fe, easily oxidizable metallic elements, and impurities.

7 Claims, 5 Drawing Sheets

(51) Int. Cl.
  *B23K 26/322* (2014.01)
  *B23K 35/28* (2006.01)
  *B23K 103/04* (2006.01)
  *B23K 103/16* (2006.01)

(52) U.S. Cl.
  CPC ........ *B23K 35/288* (2013.01); *B23K 2103/04* (2018.08); *B23K 2103/166* (2018.08)

(58) Field of Classification Search
  USPC ...................................................... 219/137
  See application file for complete search history.

WELDED JOINT

TECHNICAL FIELD

The present invention relates to a welded joint.

BACKGROUND ART

Automobile members such as automobile undercarriages and various construction material members are often manufactured using welded joints made by welding a plurality of steel materials. Since these automobile and construction material members are used after being exposed to various environments, the welded joints manufactured should have excellent corrosion resistance. Therefore, various types of zinc-based plated steel sheets, such as alloyed hot-dip galvanized steel sheets, are used as materials for such welded joints.

Here, a problem specific to welding galvanized steel sheets to manufacture welded joints is a decrease in corrosion resistance due to Zn evaporation in the plating during welding in the vicinity of a "toe" as defined in JIS Z3001 (2018).

To solve the above problem of blowhole formation, various proposals have been made in the past. For example, in Patent Document 1 below, a plated steel material is proposed, the plated steel material including: a steel sheet and a plating layer located on a surface of the steel sheet and including a Zn—Al—Mg alloy layer, wherein in a cross-section of the Zn—Al—Mg alloy layer, an area fraction of an $MnZn_2$ phase is 45 to 75%, a total area fraction of an $MgZn_2$ phase and an Al phase is 70% or more, and an area fraction of a Zn—Al—$MgZn_2$ ternary eutectic structure is 0 to 5%, and the plating layer has a predetermined chemical composition.

PRIOR ART DOCUMENT

Patent Document

Patent Document 1: International Publication Pamphlet No. WO 2018/139620

DISCLOSURE OF THE INVENTION

Problems to Be Solved by the Invention

Here, the problem of the blowhole formation can be solved by using the plated steel material proposed in Patent Document 1 above. However, the inventors have found that there is still room for improvement in the technology proposed in Patent Document 1 above, and that further improvement can be expected with regard to electrodeposition coating properties of a weld bead zone of welded joints made of galvanized steel sheet.

The present invention was made in view of the above problem, and an object thereof is to provide a welded joint capable of further improving electrodeposition coating properties in a weld bead zone.

Means for Solving the Problems

To solve the above problem, the inventors have studied the above problem and have come to the conclusion that a decrease in electrodeposition coating properties of the weld bead zone is caused by formation of non-conductive Si-based slag on a surface of a weld metal in the weld bead zone and that current flow from the surface of the weld metal to a base iron is inhibited in an area where the Si-based slag is formed. Therefore, the inventors found that if the formation of the Si-based slag on the surface of the weld metal can be suppressed, it is possible to form a path of flow of electricity from the surface of the weld metal to the base iron and to further improve the electrodeposition coating properties.

Based on such findings, the present inventors further studied and were able to find a technology that can suppress the formation of the Si-based slag that inhibits the electrodeposition of a painting material on the surface of the weld metal at the weld bead zone by improving a plated steel sheet as a material and studying appropriate welding conditions.

The gist of the invention completed based on such findings is as follows.

(1) A welded joint in which a first steel sheet and a second steel sheet are welded by arc welding or laser welding, the welded joint includes: the first steel sheet and the second steel sheet; and a weld bead zone formed by the arc welding or laser welding, wherein when a zone, which is not affected by heat due to the welding, is defined as a non-heat-affected zone in the first steel sheet and the second steel sheet, at least one of the first steel sheet or the second steel sheet has a plating layer located on at least part of a surface of a base iron and an oxide layer located on the plating layer in the non-heat-affected zone, the plating layer contains: by mass %, Al: 1.00 to 80.00%, Mg: 1.00 to 20.00%, Fe: 0.01 to 15.00%, Si: 0 to 10.00%, Ca: 0 to 4.00%, and further selectively contains 0 to 5.000% in total of: Sb: 0 to 0.500%, Pb: 0 to 0.500%, Cu: 0 to 1.000%, Sn: 0 to 1.000%, In: 0 to 1.000%, Bi: 0 to 1.000%, Ti: 0 to 1.000%, Cr: 0 to 1.000%, Nb: 0 to 1.000%, Zr: 0 to 1.000%, Ni: 0 to 1.000%, Mn: 0 to 1.000%, V: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, Sr: 0 to 0.500%, with the balance composed of 5.00 mass % or more Zn and impurities, wherein the weld bead zone has a weld metal and a slag layer formed on part of a surface of the weld metal, and the slag layer contains, by mass % when oxygen is excluded, Al: 1.0 to 45.0% and Mg: 1.0 to 30.0% with the balance composed of Fe, easily oxidizable metallic elements, and impurities.

(2) The welded joint according to (1), wherein the slag layer contains, by mass %, at least Al: 15.0 to 45.0% and Mg: 7.0 to 30.0%.

(3) The welded joint according to (1) or (2), wherein when a position at a depth of 5 nm from an uppermost surface of the oxide layer is observed by X-ray photoelectron spectroscopy (XPS), a value of an intensity ratio ([Al—O]+[Mg—O])/[Zn—O]) calculated from intensity of peaks respectively attributed to an Al—O bond, an Mg—O bond, and a Zn—O bond is 5.0 or more.

(4) The welded joint according to (3), wherein the value of the intensity ratio ([Al—O]+[Mg—O])/[Zn—O] is 10.0 or more.

(5) The welded joint according to any one of (1) to (4), wherein the plating layer in the non-heat-affected zone contains at least Al: 18.00 to 60.00 mass % and Mg: 5.00 to 15.00 mass %.

(6) The welded joint according to any one of (1) to (5), wherein the plating layer in the non-heat-affected zone contains at least Al: 35.00 to 60.00 mass % and Mg: 7.00 to 15.00 mass %, an $Mg_{32}(Al, Zn)_{49}$ phase is present in the plating layer and an Mg content [Mg], Zn content [Zn], and Al content [Al] (each unit: atom %) in the Mg32(Al, Zn) 49 phase satisfy the relationship of $0.50 \leq [Mg]/([Zn]+[Al]) \leq 0.83$.

Effect of the Invention

As explained above, the present invention enables to further improve electrodeposition coating properties at a weld bead zone in welded joints made of plated steel sheets.

EMBODIMENTS FOR CARRYING OUT THE INVENTION

The following is a detailed description of a preferred embodiment of the present invention with reference to the accompanying drawings. In this specification and the drawings, components that have substantially the same functional configuration will be omitted from the duplicated explanation by applying the same codes.

Welded Joint

Figure 1A:
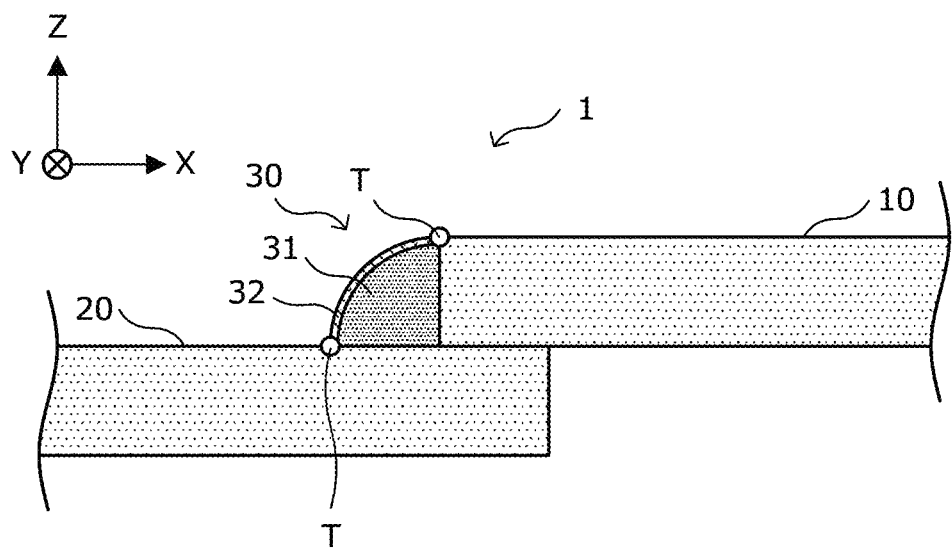
FIG. 1A is an explanatory diagram schematically illustrating an example of a structure of a welded joint according to one embodiment of the present invention.

First, an overall configuration of a welded joint of an embodiment of the present invention will be explained with reference to FIG. 1A. FIG. 1A is an explanatory diagram schematically illustrating an example of a structure of a welded joint according to this embodiment.

For convenience, a coordinate system that is illustrated in FIG. 1A shall be used in the following explanations as appropriate. In FIG. 1A, a welded joint in which two steel sheets are welded by arc welding is used as an example. A welded joint in which two steel sheets are welded by laser welding has the same configuration as in FIG. 1A, although a detailed shape, and the like of a weld bead zone are different.

FIG. 1A schematically illustrates the overall configuration of a welded joint obtained by lap fillet welding of a first steel sheet and a second steel sheet by arc welding and illustrates a cross-section of the welded joint perpendicular to an extension direction of the weld bead zone. As schematically illustrated in FIG. 1A, a welded joint 1 of this embodiment has a first steel sheet 10, a second steel sheet 20, and a weld bead zone 30.

Here, various types of plated steel sheets are preferably used as a material for at least one of the first steel sheet 10 or the second steel sheet 20 that constitute the welded joint 1, and a plated steel sheet with a plating layer as described in detail below is more preferably used as a material for both the first steel sheet 10 and the second steel sheet 20 that constitute the welded joint 1.

The weld bead zone 30 is a zone formed by arc welding and has a weld metal 31 and a slag layer 32 formed at part of a surface of the weld metal 31. During welding, interdiffusion of constituent elements occurs between the weld metal 31 and the first and second steel sheets 10 and 20. Therefore, in FIG. 1A, a joint interface between the weld metal 31 of the weld bead zone 30 and the first steel sheet 10 or the second steel sheet 20 is illustrated as a plane (using a straight line) for convenience of illustration, but an actual joint interface is a complex curved surface. In FIG. 1A, the slag layer 32 is illustrated with a uniform thickness for convenience of illustration, but an actual thickness of the slag layer 32 may not be uniform. Also, in FIG. 1A, the slag layer 32 is illustrated to cover the entire surface of the weld metal 31, but as described below, the slag layer 32 is formed to cover part of the surface of the weld metal 31. The weld bead zone 30 extends along a Y-axis direction in the figure, and the weld bead zone 30 joins the first steel sheet 10 and the second steel sheet 20.

Since components constituting the weld metal 31 vary depending on the type of a welding wire used, chemical compositions, or the like of the first steel sheet 10 and the second steel sheet 20 as the material, it is difficult to unambiguously determine components that cover all possibilities. However, such weld metal 31 is generally composed mainly of oxides of easily oxidizable elements among the various elements constituting the plated steel sheet as the material. Such easily oxidizable elements include, for example, Al, Mg, and other elements.

To identify a zone corresponding to the weld metal 31 in the welded joint 1 of interest, for example, a measurement can be performed as follows. That is, a sample with the weld metal 31 is prepared, the sample is cut in a plane (X-Z plane in FIG. 1A) orthogonal to a welding direction (Y-axis direction in FIG. 1A), and the sample is resin-embedded polished so that a cross-section (X-Z cross-section in FIG. 1A) of the weld bead zone 30 can be observed. After the polishing, the cross-section of the weld metal 31 is observed using a scanning electron microscope (SEM), and SEM-EDS (energy dispersive x-ray spectroscopy) is used to obtain elemental distribution images of various elements (Zn, Al, Mg, Fe, Cr, Ni, Ti, and other elements) to identify the slag layer 32 that is present on the weld metal 31. A zone located on the steel sheet side from the zone of the slag layer 32 identified in this way is the weld metal 31.

The oxides formed during welding are broadly classified into two types: scale and slag. Scale contains 50% or more Fe by mass % when oxygen is excluded, and the balance is composed of easily oxidizable elements and impurities. Slag contains 50% or more of easily oxidizable elements by mass % when oxygen is excluded, and the balance is composed of less than 50 mass % Fe and impurities. Here, "easily oxidizable elements" are metallic elements that are considered to be more easily oxidized than Fe in the Ellingham diagram and can be added to the plating layer. Concrete examples of such easily oxidizable metallic elements include Ca, In, Bi, Cr, Zr, Li, La, Ce, Sr, Y, Si, Mn, Al, and Ti.

Here, in JIS Z3001 (2018), a point of intersection between a surface of a base material and a surface of a weld bead is defined as a "toe". In the welded joint 1 as illustrated in FIG. 1A, a point of intersection between a surface of the weld bead zone 30 and a surface of the first steel sheet 10 or the second steel sheet 20 corresponds to such a "toe". The welded joint 1 of this embodiment focuses on a component of the slag layer 32 on the surface of the weld metal 31 in the vicinity of such a toe T.

Figure 1B:
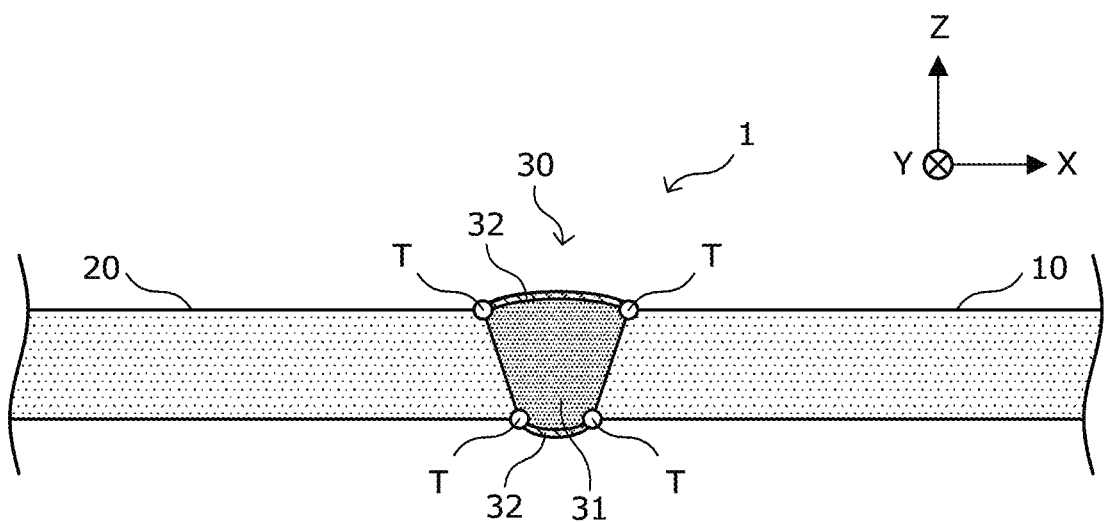
FIG. 1B is an explanatory diagram schematically illustrating an example of a structure of a welded joint according to another embodiment.
Figure 1C:
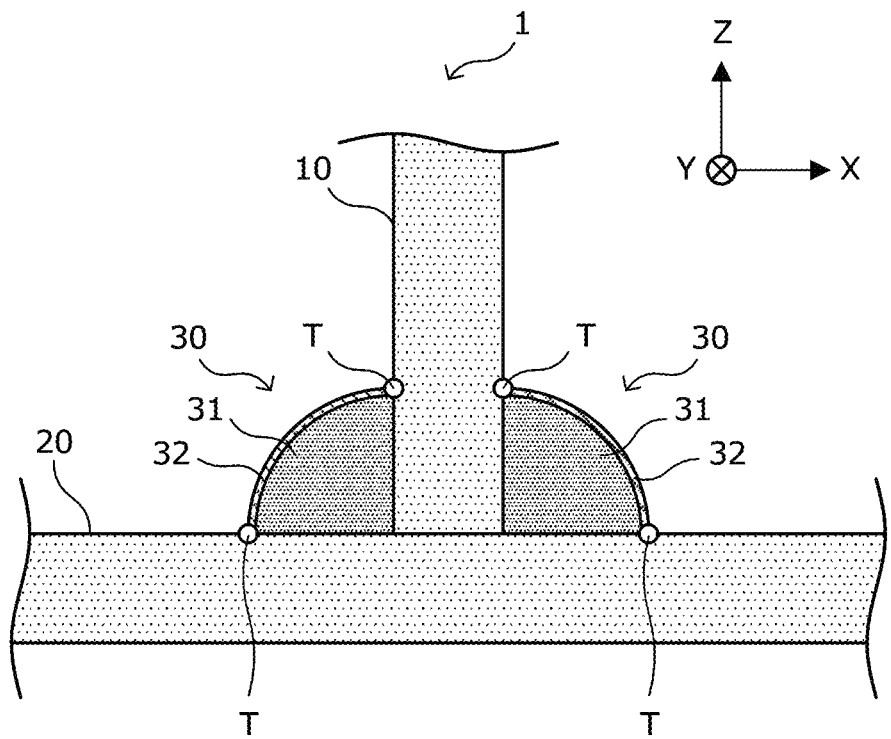
FIG. 1C is an explanatory diagram schematically illustrating an example of a structure of a welded joint according to still another embodiment.
Figure 1D:
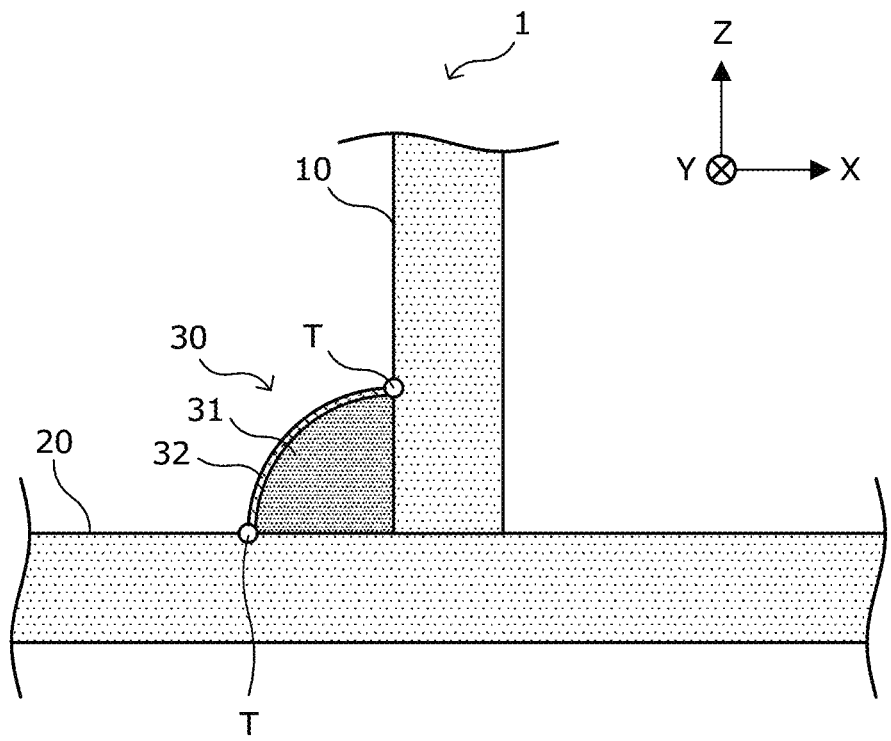
FIG. 1D is an explanatory diagram schematically illustrating an example of a structure of a welded joint according to the other embodiment.

The "toe T" is not only defined for a lap fillet welded joint as illustrated in FIG. 1A, but also for a butt welded joint as illustrated in FIG. 1B, T-welded joints as illustrated in FIG. 1C and FIG. 1D, and other welded joints.

<Non-Heat-Affected Zone>

Figure 2:
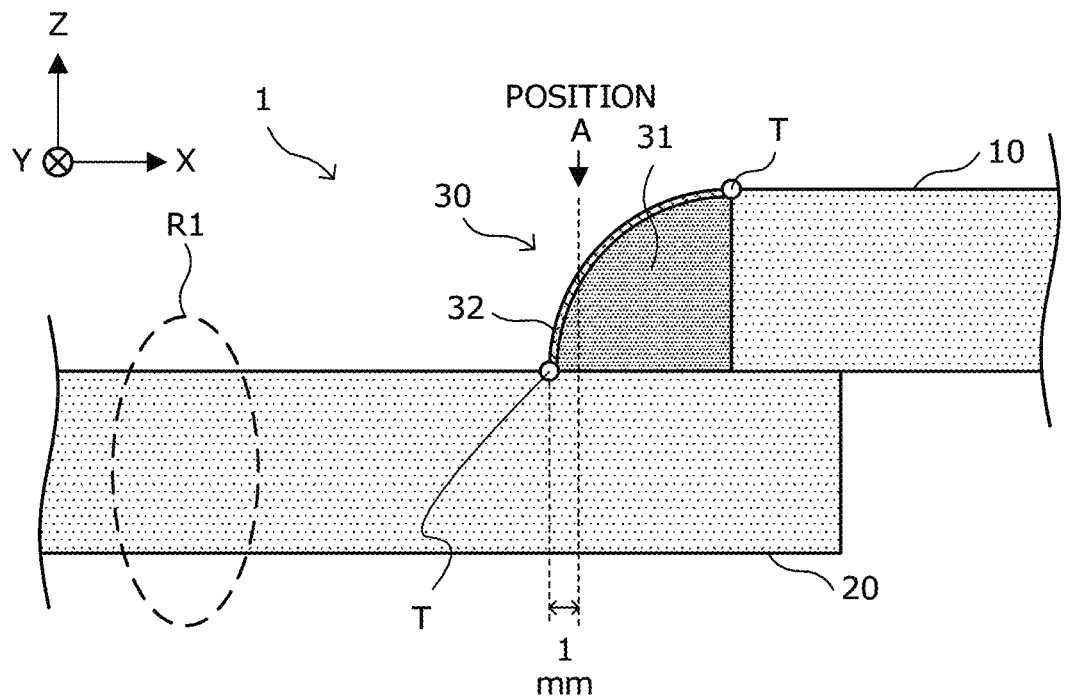
FIG. 2 is an explanatory diagram to explain the welded joint according to the embodiment illustrated in FIG. 1A.

A configuration of a zone of the welded joint 1 of this embodiment, where there is no heat-affect by welding, is then described in detail, with reference to FIG. 2. FIG. 2 is a diagram schematically illustrating a cross-section of the welded joint 1 perpendicular to the extension direction of the weld bead zone 30.

In the following description, a zone of the welded joint 1, which is not affected by heat due to welding, is referred to as a "non-heat-affected zone". In the welded joint 1 illustrated in FIG. 2, for example, a region R1 sufficiently separated from the vicinity of the toe T, as enclosed by a dashed line in the figure, corresponds to such a non-heat-affected zone. A location of such a non-heat-affected zone can be considered, for example, as a region orthogonal to the extension direction of the weld bead zone 30 (Y-axis direction in FIG. 2) and separating in a direction separating from the toe T (X-axis direction in FIG. 2) by 3 mm or more, for example, from the toe T as illustrated in FIG. 2.

Figure 3:
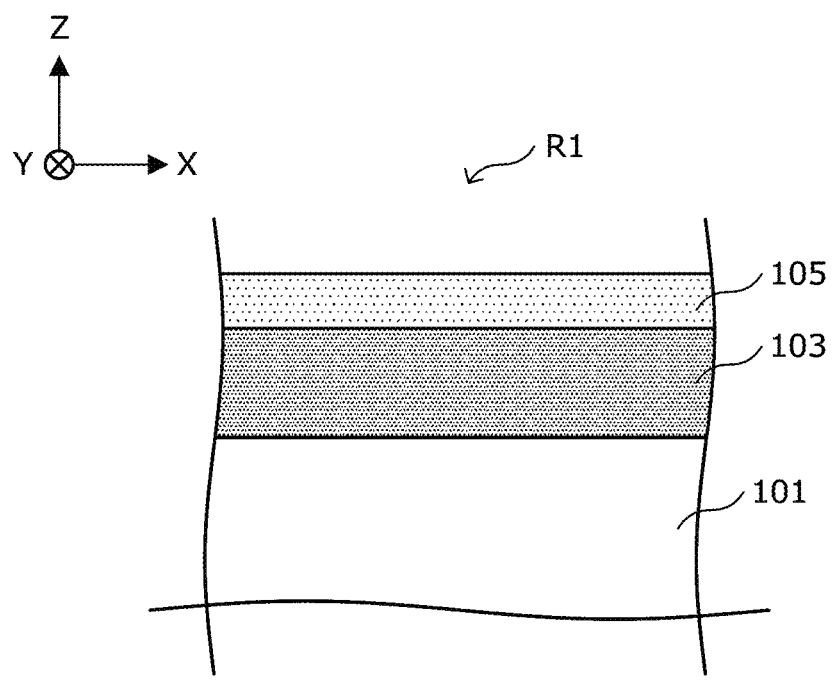
FIG. 3 is an explanatory diagram to explain the welded joint according to the embodiment.

FIG. 3 is a diagram schematically illustrating a part of a cross-section parallel to a sheet thickness direction in the non-heat-affected zone R1. The non-heat-affected zone R1 in at least one of the first steel sheet 10 or the second steel sheet 20 has a base iron 101, a plating layer 103 located at least part of a surface of the base iron 101, and an oxide layer 105 located on the plating layer 103, as schematically illustrated in FIG. 3. In the welded joint 1 of this embodiment, the plating layer 103 and the oxide layer 105 as described above may be present on one surface of the base iron 101, but it is more preferable that they are present on both surfaces of the base iron 101.

Each of these base iron 101, plating layer 103, and oxide layer 105 will be described in detail below.

<<Base Iron 101>>

In the welded joint 1 of this embodiment, the base iron 101 corresponding to the base material of the plated steel sheet, which is a material, is not limited. Various steel sheets can be used as the base iron 101 depending on mechanical strength (for example, tensile strength) and other strengths required for the welded joint 1. Examples of such steel sheets include, for example, various types of steel sheets such as various types of Al-killed steel, ultralow carbon steel containing Ti, Nb, and the like, high-strength steel further containing strengthening elements such as P, Si, and Mn in the ultralow carbon steel, and other steels.

A thickness of the base iron 101 is not limited and should be set appropriately according to the mechanical strength required for the welded joint 1.

<<Plating Layer 103>>

The plating layer 103 is provided on at least part of the surface of the base iron 101, as schematically illustrated in FIG. 3, and is more preferably provided over an entire surface of the base iron 101. Such plating layer 103 is derived from a plating layer that is held by the plated steel sheet, which is the material of the welded joint 1.

In the following, a chemical composition of such plating layer 103 is first described in detail.

Chemical Composition of Plating Layer 103

As the chemical composition, the plating layer 103 of this embodiment contains, by mass %, Al: 1.00 to 80.00%, Mg: 1.00 to 20.00%, Fe: 0.01 to 15.00%, Si: 0 to 10.00%, Ca: 0 to 4.00%, with the balance composed of 5.00 mass % or more Zn and impurities. In other words, in the chemical composition of the plating layer 103 of this embodiment, contents of Al, Mg, Fe, Si, and Ca are within the above ranges and the sum of these contents is less than 100 mass %, with the balance composed of 5.00 mass % or more Zn and impurities.

These components and their contents are described in detail below.

[Al: 1.00 to 80.00 Mass %]

Al is an element necessary to constitute a main phase (Zn—Al—Mg-based alloy phase) of the plating layer 103 of this embodiment. Al is contained in a predetermined content or more to ensure corrosion resistance of a non-heat-affected zone. When an Al content in the plating layer 103 is less than 1.00 mass %, the corrosion resistance of the non-heat-affected zone cannot be ensured as described above. Therefore, in the plating layer 103 of this embodiment, the Al content is 1.00 mass % or more. The Al content is preferably 18.00 mass % or more, and more preferably 35.00 mass % or more. The corrosion resistance of the non-heat-affected zone can be ensured by the Al content in the above range.

On the other hand, when the Al content in the plating layer 103 exceeds 80.00 mass %, an Al phase, which functions as a cathode when placed in a corrosive environment, increases excessively, and the corrosion of the base iron is likely to proceed, thus the corrosion resistance of the non-heat-affected zone cannot be ensured. Therefore, in the plating layer 103 of this embodiment, the Al content is 80.00 mass % or less. The Al content is preferably 60.00 mass % or less, and more preferably 50.00 mass % or less.

[Mg: 1.00 to 20.00 Mass %]

Mg is an element necessary to constitute the main phase (Zn—Al—Mg-based alloy phase) of the plating layer 103 of this embodiment. Mg is contained in a predetermined content or more to ensure the corrosion resistance of the non-heat-affected zone. Therefore, in the plating layer 103 of this embodiment, an Mg content is 1.00 mass % or more. The Mg content is preferably 5.00 mass % or more, and more preferably 7.00 mass % or more. The corrosion resistance of the non-heat-affected zone can be ensured by the Mg content in the above range.

On the other hand, when the Mg content in the plating layer 103 exceeds 20.00 mass %, anodic dissolution of the plating layer is likely to proceed when placed in the corrosive environment, and the corrosion resistance of the non-heat-affected zone cannot be ensured. Therefore, in the plating layer 103 of this embodiment, the Mg content is 20.00 mass % or less. The Mg content is preferably 15.00 mass % or less, and more preferably 13.00 mass % or less.

The corrosion resistance of the non-heat-affected zone can be ensured by the Mg content in the above range.

[Fe: 0.01 to 15.00 Mass %]

Elements constituting the base iron 101, which is the base material, may be sometimes mixed into the plating layer 103. Especially when the plating layer 103 is formed by a hot-dip plating method, the elements constituting the base iron 101 are easily mixed into the plating layer 103 due to interdiffusion of the elements by a solid-liquid reaction between the base iron 101 and the plating layer 103. Due to such mixing of the elements, a predetermined amount of Fe is contained in the plating layer 103, and the content is generally 0.01 mass % or more. When the above interdiffusion is promoted, adhesiveness between the base iron 101 and the plating layer 103 is improved. From the perspective of improving the adhesiveness between the base iron 101 and the plating layer 103, an Fe content in the plating layer 103 is preferably 0.20 mass % or more.

Fe may be intentionally added to a plating bath used to manufacture the plating layer 103 to the extent that the effect of the present invention is not impaired. However, when the Fe content in the plating layer 103 is 15.00 mass % or more, high melting point intermetallic compounds of Fe and Al are formed in the plating bath, and such high melting point intermetallic compounds adhere to the plating layer as dross and significantly degrades an appearance quality, which is undesirable. From this perspective, the Fe content in the plating bath is adjusted so that the Fe content in the plating layer 103 is 15.00 mass % or less. The Fe content in the plating layer 103 is more preferably 10.00 mass % or less.

[Si: 0 to 10.00 Mass %]

Si is an element capable of suppressing excessive growth of Fe—Al-based intermetallic compounds that are formed at an interface between the plating layer and the base iron and improving the adhesiveness between the plating layer and the base iron. A Si content is preferably 0.05 mass % or more, and more preferably 0.20 mass % or more to suppress the excessive growth of the Fe—Al-based intermetallic compounds. On the other hand, when the Si content exceeds 10.00 mass %, it is difficult to suppress Zn evaporation during welding because a high melting point intermetallic compound with Mg is excessively formed and the formation of an Al—Mg oxide film with Zn evaporation suppression effect is inhibited.

On the other hand, when the Si content in the plating bath for manufacturing the plating layer 103 is too high, viscosity of the plating bath may increase more than necessary, and plating operability may decrease. Therefore, the Si content in the plating bath is adjusted from the perspective of plating operability so that the Si content in the plating layer 103 is 10.00 mass % or less. The Si content in the plating layer 103 is preferably 5.00 mass % or less, and more preferably 2.00 mass % or less.

[Ca: 0 to 4.00 Mass %]

When Ca is contained in the plating layer 103, it forms intermetallic compounds with Al and Zn. Furthermore, when Si is contained together with Ca in the plating layer 103, Ca forms intermetallic compounds with Si. These intermetallic compounds have a high melting point and a stable structure, which can suppress blowhole formation caused by Zn evaporation during welding of the plated steel sheet and LME. Such a suppression effect of blowhole formation and LME during welding is achieved when a Ca content is 0.01 mass % or more. The Ca content in the plating layer 103 is more preferably 0.10 mass % or more.

On the other hand, when the Ca content in the plating layer 103 exceeds 4.00 mass %, corrosion resistance of the non-heat-affected zone will decrease. From this perspective, the Ca content in the plating layer 103 is 4.00 mass % or less. The Ca content in the plating layer 103 is preferably 2.50 mass % or less, and more preferably 1.50 mass % or less.

In the plating layer 103, the balance of the above Al, Mg, Fe, Si, and Ca is 5.00 mass % or more Zn and impurities. Zn is an element necessary to constitute the main phase (Zn— Al—Mg-based alloy phase) of the plating layer 103 of this embodiment and is an important element to improve the corrosion resistance of the non-heat-affected zone. The Zn content is set to 5.00 mass % or more because such an effect of improving the corrosion resistance of the non-heat-affected zone is achieved when the Zn content is 5.00 mass % or more.

In addition, the plating layer 103 of this embodiment may further selectively contain 0 to 5.000% in total of Sb: 0 to 0.500%, Pb: 0 to 0.500%, Cu: 0 to 1.000%, Sn: 0 to 1.000%, In: 0 to 1.000%, Bi: 0 to 1.000%, Ti: 0 to 1.000%, Cr: 0 to 1.000%, Nb: 0 to 1.000%, Zr: 0 to 1.000%, Ni: 0 to 1.000%, Mn: 0 to 1.000%, V: 0 to 1.000%, Mo: 0 to 1.000%, Ag: 0 to 1.000%, Li: 0 to 1.000%, La: 0 to 0.500%, Ce: 0 to 0.500%, B: 0 to 0.500%, Y: 0 to 0.500%, and Sr: 0 to 0.500%, instead of part of Zn as the balance. In other words, the plating layer 103 of this embodiment may contain at least any element of Sb, Pb, Cu, Sn, In, Bi, Ti, Cr, Nb, Zr, Ni, Mn, V, Mo, Ag, Li, La, Ce, B, Y, and Sr as optional additive elements within the above content ranges and a total content of 5.000 mass % or less.

By setting the total content of the above optional additive elements to 5.000 mass % or less, it is possible to enjoy the effects achieved by the addition of each optional additive element, as described in detail below, without impairing each other. The total content of the above optional additive elements is preferably 1.000 mass % or less, and more preferably 0.200 mass % or less.

The content of each optional additive element is described in detail below.

[Sb: 0 to 0.500 Mass %]
[Pb: 0 to 0.500 Mass %]
[Sr: 0 to 0.500 Mass %]

When at least any of Sb, Pb, and Sr is contained in the plating layer 103, spangles are formed on the surface of the plating layer 103, which improves metallic luster. Therefore, from the perspective of improving design of the plated steel sheet, at least any of Sb, Pb, and Sr is preferably contained in the plating layer 103. Such a design improvement effect is achieved when the content of at least any of Sb, Pb, and Sr is 0.050 mass % or more. Therefore, when at least any of Sb, Pb, and Sr is contained in the plating layer 103, the content of each of these elements should be independently 0.050 mass % or more.

On the other hand, when forming the plating layer 103 in which any of the contents of Sb, Pb, and Sr exceeds 0.500 mass %, an amount of dross generated in the plating bath used to form the plating layer 103 increases, and a plated steel sheet with good plating properties cannot be manufactured. Therefore, the content of each of Sb, Pb, and Sr in the plating layer 103 is independently 0.500 mass % or less, and preferably independently 0.200 mass % or less.

[Cu: 0 to 1.000 Mass %]
[Ti: 0 to 1.000 Mass %]
[Cr: 0 to 1.000 Mass %]
[Nb: 0 to 1.000 Mass %]
[Ni: 0 to 1.000 Mass %]
[Mn: 0 to 1.000 Mass %]
[V: 0 to 1.000 Mass %]

When at least any of Cu, Ti, Cr, Nb, Ni, Mn, and V is contained in the plating layer 103, these elements are incorporated into the Al—Fe alloy phase formed by welding when such plated steel sheet is welded, and the corrosion resistance of the weld bead zone 30 formed can be improved. Such an effect of improving the corrosion resistance of the weld zone is achieved when the content of any of Cu, Ti, Cr, Nb, Ni, Mn, and V in the plating layer 103 is 0.005 mass % or more. Therefore, when at least any of Cu, Ti, Cr, Nb, Ni, Mn, and V is contained in the plating layer 103, the content of each of these elements is preferably 0.005 mass % or more, independently.

On the other hand, when forming the plating layer 103 in which any of the content of Cu, Ti, Cr, Nb, Ni, Mn, and V exceeds 1.000 mass %, these elements easily form various intermetallic compounds in the plating bath to form the plating layer 103, causing the viscosity of the plating bath to increase and making it impossible to manufacture a plated steel sheet with good plating properties. Therefore, the content of each of Cu, Ti, Cr, Nb, Ni, Mn, and V in the plating layer 103 is independently 1.000 mass % or less, and preferably 0.200 mass % or less, independently.

[Sn: 0 to 1.000 Mass %]
[In: 0 to 1.000 Mass %]
[Bi: 0 to 1.000 Mass %]

Sn, In, and Bi are elements that increase an Mg dissolution rate when the plating layer 103 containing Zn, Al, and Mg is placed in the corrosive environment. When the Mg dissolution rate increases, Mg ions are supplied to exposed portions of the base iron, and the corrosion resistance is improved. From this perspective, when Sn, In, and Bi are contained, the content of each of Sn, In, and Bi is independently 0.0050 mass % or more. On the other hand, excessive addition of Sn, In, and Bi may excessively accelerate the Mg dissolution rate and reduce the corrosion resistance of the non-heat-affected zone. The content of each of Sn, In, and Bi is independently 1.000 mass % or less because such an increase in the Mg dissolution rate becomes more pronounced when any of the contents of Sn, In, and Bi exceeds 1.000 mass %. The content of each of Sn, In, and Bi is preferably 0.200 mass % or less, independently.

[Zr: 0 to 1.000 Mass %]

When Zr is contained in the plating layer 103, the plating operability can be improved. Such an effect of improved plating operability is achieved when a Zr content is 0.010 mass % or more. Therefore, when Zr is contained, the content is preferably set to 0.010 mass % or more.

On the other hand, when forming the plating layer 103 in which the Zr content exceeds 1.000 mass %, a large amount of dross is likely to be generated in the plating bath used to form the plating layer 103. Therefore, the content of Zr is 1.000 mass % or less, and preferably 0.010 mass % or less.

[Mo: 0 to 1.000 Mass %]

When Mo is contained in the plating layer 103, the corrosion resistance can be improved. Such an effect of improved corrosion resistance is achieved when an Mo content is 0.010 mass % or more. Therefore, when Mo is contained, the content is preferably 0.010 mass % or more.

On the other hand, when forming the plating layer 103 in which the Mo content exceeds 1.000 mass %, a large amount of dross is likely to be generated in the plating bath used to form the plating layer 103. Therefore, the Mo content is 1.000 mass % or less, and preferably 0.010 mass % or less.

[Ag: 0 to 1.000 Mass %]

When Ag is contained in the plating layer 103, the plating operability can be improved. Such an effect of improved plating operability is achieved when an Ag content is 0.010 mass % or more. Therefore, when Ag is contained, the content is preferably 0.010 mass % or more.

On the other hand, when forming the plating layer 103 in which the Ag content exceeds 1.000 mass %, a large amount of dross is likely to be generated in the plating bath used to form the plating layer 103. Therefore, the Ag content is 1.000 mass % or less, and preferably 0.050 mass % or less.

[Li: 0 to 1.000%]

When Li is contained in the plating layer 103, the plating operability can be improved. Such an effect of improved plating operability is achieved when a Li content is 0.010 mass % or more. Therefore, when Li is contained, the content is preferably set to 0.010 mass % or more.

On the other hand, when forming the plating layer 103 in which the Li content exceeds 1.000 mass %, a large amount of dross is likely to be generated in the plating bath used to form the plating layer 103. Therefore, the Li content is 1.000 mass % or less, and preferably 0.050 mass % or less.

[La: 0 to 0.500 Mass %]
[Ce: 0 to 0.500 Mass %]
[Y: 0 to 0.500 Mass %]

La, Ce, and Y are elements that achieve almost the same effect as Ca in suppressing the blowhole formation during welding. This is because an atomic radius of each element is close to that of Ca. When these elements are contained in the plating layer 103, they replace a Ca position. Therefore, these elements are detected at the same position as Ca in EDS. Even when these elements become oxides, the oxides of these elements are detected at the same position as CaO.

Such a suppression effect of the blowhole formation during welding is achieved when the content of each of these elements is independently 0.010 mass % or more. Therefore, each of the La, Ce, and Y contents in the plating layer 103 is more preferably 0.050 mass % or more, independently.

On the other hand, when the La, Ce, and Y contents in the plating bath for manufacturing the plating layer 103 are too high, the viscosity of the plating bath may increase more than necessary and the plating operability may decrease. Therefore, the La, Ce, and Y contents in the plating bath are adjusted from the perspective of the plating operability, so that each of the La, Ce, and Y contents is 0.500 mass % or less, independently. Each of the La, Ce, and Y contents is preferably 0.100 mass % or less, independently.

[B: 0 to 0.500 Mass %]

When B is contained in the plating layer 103, the effect of further suppressing LME is obtained. This is presumably because when B is contained in the plating layer 103, B forms various intermetallic compounds by combining with at least any of Zn, Al, Mg, and Ca. The presence of B in the plating layer 103 is also considered to have the effect of further suppressing the LME of the base iron 101 by diffusing B from the plating layer 103 into the base iron 101 and strengthening grain boundary. Furthermore, the various intermetallic compounds formed with respect to B are presumably also effective in suppressing the Zn evaporation during welding because of their extremely high melting points. These improvement effects are achieved when B is contained 0.050 mass % or more. Therefore, a B content in the plating layer 103 is more preferably 0.050 mass % or more.

On the other hand, when B is excessively contained in the plating bath so that B is contained in the plating layer 103, a plating melting point increases rapidly, resulting in a decrease in the plating operability, and plated steel sheets with excellent plating properties cannot be manufactured. Such a decrease in the plating operability is more pronounced when the B content exceeds 0.500 mass %, so the B content should be 0.500 mass % or less. The B content is preferably 0.100 mass % or less.

[Measurement Method of Chemical Component]

The chemical component of the above plating layer 103 can be measured using ICP-AES (inductively coupled plasma atomic emission spectrometry) or ICP-MS (inductively coupled plasma mass spectrometry). ICP-AES shall be used when analyzing chemical components down to 0.1 mass % units, and ICP-MS shall be used when analyzing chemical components in trace amounts of less than 0.1 mass %. The area of interest in the non-heat-affected zone is immersed in a 10% HCl aqueous solution with an inhibitor for about 1 minute to peel off the plating layer, and the solution dissolving the plating layer is prepared. The obtained solution is analyzed by ICP-AES or ICP-MS to obtain an overall average chemical component of the plating layer.

More Preferred Chemical Composition of Plating Layer 103

The plating layer 103 of this embodiment has the above chemical composition, but the more preferred chemical composition is as follows.

That is, the plating layer 103 of this embodiment more preferably contains at least 18.00 to 60.00 mass % Al and 5.00 to 15.00 mass % Mg as the chemical composition and further contains the optional additive elements as described above if necessary.

The plating layer 103 of this embodiment contains at least 35.00 to 60.00 mass % Al and 7.00 to 15.00 mass % Mg as the chemical composition, and further, if necessary, contains the optional additive elements as described above, and further, it is even more preferred that an $Mg_{32}(Al, Zn)_{49}$ phase is present in the plating layer 103.

The $Mg_{32}(Al, Zn)_{49}$ phase is defined as a phase in which the Mg content [Mg], Zn content [Zn], and Al content [Al] in grains of the $Mg_{32}(Al, Zn)_{49}$ phase satisfy $0.5 \leq [Mg]/([Zn]+[Al]) \leq 0.83$ by atom %. That is, it is defined as a crystal phase or a quasi-crystalline phase where Mg:(Zn+Al), which is a ratio between Mg atoms and a sum of Zn atoms and Al atoms, is 3:6 to 5:6. The chemical component of the $Mg_{32}(Al, Zn)_{49}$ phase is preferably measured by using TEM-EDX (transmission electron microscope-energy dispersive X-ray spectroscopy). The $Mg_{32}(Al, Zn)_{49}$ phase is sometimes detected as the quasi-crystalline phase in addition to the crystal phase. In the case of the crystal phase, it is possible to identify the crystal structure as the $Mg_{32}(Al, Zn)_{49}$ phase from an electron diffraction image in the TEM observation. When the $Mg_{32}(Al, Zn)_{49}$ phase is the quasi-crystalline phase, it can be confirmed by taking electron diffraction images by TEM and checking whether a five-fold symmetric crystal structure is observed in the electron diffraction images. The five-fold symmetric crystal structure can be determined by obtaining an electron diffraction image called a Penrose pattern.

The $Mg_{32}(Al, Zn)_{49}$ phase achieves sacrificial corrosion resistance to the plated steel sheet, thereby suppressing corrosion of base iron from a cut zone where the base iron is exposed and a weld zone and improving red rust resistance. In addition to these effects, the $Mg_{32}(Al, Zn)_{49}$ phase itself has excellent corrosion resistance, and since a corrosion rate of the $Mg_{32}(Al, Zn)_{49}$ phase is slow even in a corrosive environment, it also has an effect of suppressing under-film corrosion and improving corrosion resistance after coating in terms of coating film blister width.

Adhesion Amount of Plating Layer 103

Although an adhesion amount of the plating layer 103 as explained above is not specified, for example, it is preferably about 15 to 250 g/m² per one side of the base iron 101. When the adhesion amount of the plating layer 103 is within the above-mentioned range, the non-heat-affected zone of the welded joint 1 of this embodiment can exhibit sufficient corrosion resistance.

Such adhesion amount of the plating layer 103 is measured as described below. First, a sample is cut from the plated steel sheet to a size of 30 mm×30 mm, and a mass of the sample is measured beforehand. A tape seal is applied to one side of the sample to prevent the plating layer on this side from dissolving in the next process. The sample is then immersed in a 10% HCl aqueous solution with an inhibitor added, the plating layer is peeled off by pickling, and the mass of the sample after pickling is measured. From a change in the mass of the sample before and after pickling, the adhesion amount of the plating layer 103 per one side can be determined.

<<Oxide Layer 105>>

Subsequently, the oxide layer 105 held by the non-heat-affected zone of the welded joint 1 of this embodiment will be described in detail.

As schematically illustrated in FIG. 3, the oxide layer 105 is located on a surface of the plating layer 103 as described above. Such oxide layer 105 is derived from an oxide layer held by the plated steel sheet, which is the material of the welded joint 1.

The oxide layer 105 is formed when elements that are easily oxidized in the plating layer 103 react with oxygen in a heat treatment atmosphere during a cooling process to solidify the plating layer, which is performed when the plated steel sheet is manufactured.

As described above, the oxide layer 105 is mainly composed of oxides of the elements constituting the plating layer 103, and its chemical composition varies depending on the elements contained in the plating layer 103. It is presumed that the oxide layer 105 contains Zn oxide, Mg oxide, and Al oxide in total of 50 mass % or more, and may further contain hydroxides of these Zn, Mg, and Al, at least either of oxides or hydroxides of other constituent elements in the plating layer 103, impurities, and the like.

Figure 4:
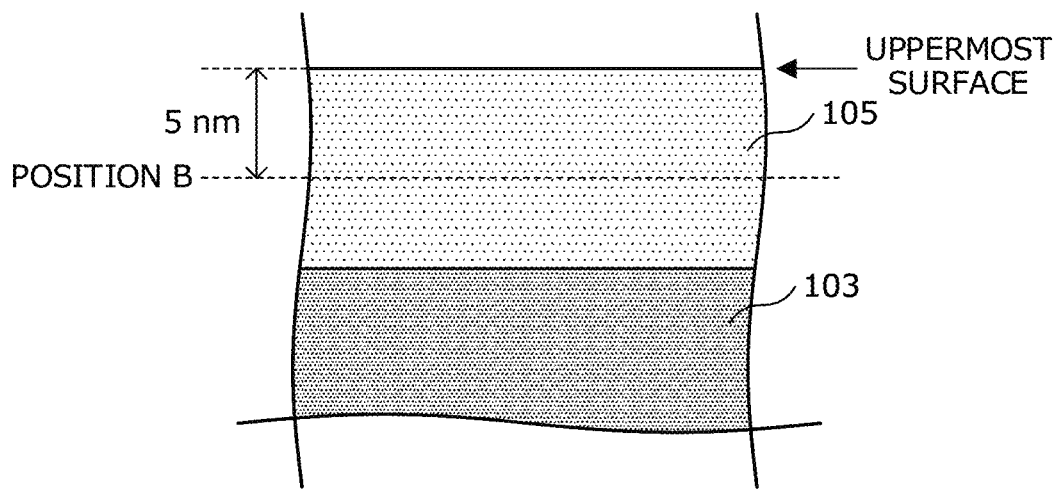
FIG. 4 is an explanatory diagram to explain the welded joint according to the embodiment.
Figure 5:
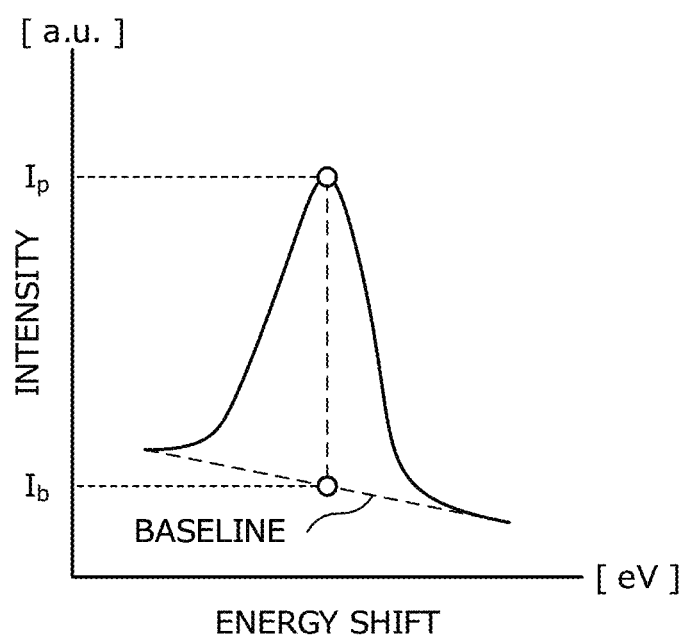
FIG. 5 is an explanatory diagram to explain intensity of peaks in XPS measurement results.

Here, the oxide layer 105 of this embodiment is present in the following specific state, as a result of undergoing a specific heat treatment process, as detailed below, when the plated steel sheet that will be used as the material is manufactured. Such a state will be explained in detail below with reference to FIG. 4 and FIG. 5. FIG. 4 is a diagram schematically illustrating a part of a cross-section parallel to a sheet-thickness direction of the oxide layer. FIG. 5 is an explanatory diagram to explain the intensity of peaks in the XPS measurement results.

The plated steel sheet that will be used as the material is manufactured through the specific heat treatment process as detailed below, and thereby, the oxide layer 105 of this embodiment is a dense state film where a sum of a presence amount of at least either of oxide or hydroxide of Al and a presence amount of at least either of oxide or hydroxide of Mg is greater than a presence amount of at least either of oxide or hydroxide of Zn. The following is a more concrete explanation.

Now, as schematically illustrated in FIG. 4, a position at a depth of 5 nm from an uppermost surface of the oxide layer 105 ("Position B" in FIG. 4) is focused. In the oxide layer 105 of this embodiment, when such a position is observed by X-ray photoelectron spectroscopy (XPS), a value of an intensity ratio calculated from intensity of peaks attributed to each of an Al—O bond, an Mg—O bond, and a Zn—O bond ([Al—O]+[Mg—O])/[Zn—O] is preferably 5.0 or more.

Here, the uppermost surface of the oxide layer 105 may be contaminated with oil, grease, or other contaminants. Therefore, it is desirable to perform the above XPS measurement in the absence of such contamination, and the like. From this perspective, ultrasonic cleaning in ethanol or other treatments is applied to the surface of the oxide layer 105 to remove contaminants, and the like, and the surface obtained by such treatment is used as the "uppermost surface of the oxide layer 105" for the XPS measurement as described above.

The oxide layer 105 is then removed by Ar ion etching to a depth of 5 nm from the uppermost surface obtained as described above, and the resulting surface of the oxide layer 105 is measured by XPS. Here, XPS measurement conditions can be, for example, as follows.

X-ray source: mono-Al Kα (1486.6 eV)
X-ray diameter: 50 to 200 μm
Measurement area: 100 to 700 μm×100 to 700 μm
Degree of vacuum: $1\times10^{-10}$ to $1\times10^{-11}$ torr (1 torr is 133.32 Pa)
Acceleration voltage: 1 to 10 kV In this embodiment, the peaks respectively attributed to the Al—O, Mg—O, and Zn—O bonds are focused in the obtained XPS measurement results. The above bonds are characteristic of at least either of oxides or hydroxides of Al, Mg, and Zn. It can be assumed that the intensity of the peaks attributed to these bonds is positively correlated with the presence amount of at least either of the oxides or hydroxides of Al, Mg, and Zn.

The peak attributed to the Al—O bond is the peak observed in a range of 72 to 76 eV in the XPS spectrum focused on Al 2p3/2. The peak attributed to the Mg—O bond is the peak observed in a range of 48 to 52 eV in the XPS spectrum focused on Mg 2p3/2. The peak attributed to the Zn—O bond is the peak observed in a range of 1018 to 1024 eV in the XPS spectrum focused on Zn 2p3/2.

The intensity of the peak attributed to each bond is the intensity where a baseline intensity $I_b$ is subtracted from a peak intensity $I_p$ to be focused (that is, "$I_p-I_b$") in the XPS spectrum as schematically illustrated in FIG. 5, taking into account the baseline of the peak to be focused.

The more detailed method of calculating the intensity ratio is as follows.

That is, XPS is measured as described above at an arbitrary location on a surface corresponding to the position at the depth of 5 nm from the uppermost surface (surface of "position B" in FIG. 4) obtained as described above, and the value of the intensity ratio ([Al—O]+[Mg—O])/[Zn—O]) is calculated. This measurement and calculation process is performed at each of five arbitrary locations on the surface corresponding to "position B", and an average of the five intensity ratios obtained is used as the value of the intensity ratio ([Al—O]+[Mg—O])/[Zn—O] in the oxide layer 105 of this embodiment.

In the oxide layer 105 of this embodiment, the formation of a dense film such that the value of the above intensity ratio is 5.0 or more can suppress the Zn evaporation during welding and the blowhole formation caused by the Zn evaporation. When the value of the above intensity ratio is less than 5.0, the required denseness of the oxide layer 105 may become insufficient. The value of the intensity ratio is more preferably 10.0 or more. On the other hand, an upper limit of the value of the intensity ratio ([Al—O]+[Mg—O])/[Zn—O] is not specified, but about 100.0 is a practical upper limit.

A thickness (more precisely, an average thickness) of the oxide layer 105 as explained above is not specified, but it is preferably, for example, approximately in a range of 0.05 to 2.00 μm per one side of the base iron 101. When the thickness of the oxide layer 105 is within the above range, the non-heat-affected zone of this embodiment can sufficiently suppress the blowhole formation due to the Zn evaporation during welding. The oxide layer 105 with the above thickness can be achieved by controlling a sheet-feeding speed of the steel sheet to an appropriate range while undergoing the heat treatment process as described in detail below when the steel sheet that will be used as the material is manufactured.

The thickness of such oxide layer 105 can be measured using XPS. The thickness of the oxide layer is defined as the depth from the surface of the plated steel sheet to a point where a maximum intensity of oxygen becomes 1/20 of a maximum intensity at the uppermost surface, using XPS measurement in a depth direction at a pitch of 1 to 3 nm. The same XPS measurement conditions as above can be used.

The non-heat-affected zone in the welded joint 1 of this embodiment has been described in detail with reference to FIG. 2 to FIG. 5.

The non-heat-affected zone in the welded joint 1 of this embodiment may further include one or two or more various types of films on the oxide layer 105. Such films include, for example, a chromate film, phosphate film, chromate-free film, organic resin film, and other films.

<Weld Bead Zone>

Next, features of the weld bead zone in the welded joint 1 of this embodiment will be explained with reference to FIG. 2.

In the welded joint 1 of this embodiment, the plated steel sheet having the plating layer 103 and the oxide layer 105 as described above is used as a material for at least one of the first steel sheet 10 or the second steel sheet 20. As a result, the slag layer 32 is formed that has the following composition, thereby suppressing formation of Si-based slag on the surface of the weld metal 31.

In more detail, formation of slag containing Al and Mg (Al—Mg-containing slag) as the slag layer 32, which is formed on the surface of the weld metal 31, suppresses the formation of the Si-based slag. The Al—Mg-containing slag does not have electric conductivity as same as the Si-based slag, but when the Al—Mg-containing slag is formed on the surface of the weld metal 31, an area covering the surface of the weld metal 31 is smaller than the case when the Si-based slag is formed. In other words, the slag can be made finer. This allows the welded joint 1 of this embodiment to improve the electrodeposition coating properties of the weld bead zone.

To achieve the above effect, attention is paid to a chemical composition of the slag layer 32. Regarding the chemical composition of the slag layer 32 at such a position A, the weld bead zone 30 of this embodiment contains, when indicated by mass % excluding oxygen, Al: 1.0 to 45.0 and Mg: 1.0 to 30.0% with the balance composed of Fe, easily oxidizable metallic elements, and impurities. Here, "easily oxidizable metallic elements" are metallic elements that are considered to be more easily oxidized than Fe in the Ellingham diagram and can be added to the plating layer 103. Concrete examples of such easily oxidizable metallic elements include Ca, In, Bi, Cr, Zr, Li, La, Ce, Sr, Y, Si, Mn, Al, and Ti.

These components and their contents are described in detail below.

[Al: 1.0 to 45.0 Mass %]

When the Al content is less than 1.0 mass %, it means that excessive Al evaporated during welding. In such a case, the Al—Mg-containing slag formed on the surface of the weld metal 31 is insufficient and the formation of the Si-based slag is difficult to suppress. Therefore, the Al content in the slag layer 32 at the position A is required to be 1.0 mass % or more. The Al content is preferably 15.0 mass % or more, and more preferably 30.0 mass % or more. The Al content in such a range suppresses the formation of the Si-based slag owing to the Al—Mg-containing slag and improves the electrodeposition coating properties at the weld bead zone 30.

On the other hand, when the Al content exceeds 45.0 mass %, the Mg content consumed to form the Al—Mg-containing slag may be insufficient. As a result, the Al—Mg-containing slag is difficult to be formed on the surface of the weld metal 31 and the formation of the Si-based slag is difficult to suppress. Therefore, the Al content in the slag layer 32 at the position A is required to be 45.0 mass % or less. The Al content is preferably 43.0 mass % or less, and more preferably 41.0 mass % or less. The Al content in such a range suppresses the formation of the Si-based slag owing to the Al—Mg-containing slag and improves the electrodeposition coating properties at the weld bead zone 30.

[Mg: 1.00 to 30.00 Mass %]

When the Mg content is less than 1.0 mass %, it means that excessive Mg evaporated during welding. In such a case, the Al—Mg-containing slag formed on the surface of the weld metal 31 is insufficient and the formation of the Si-based slag is difficult to suppress. Therefore, the Mg content of the slag layer 32 at the position A is required to be 1.0 mass % or more. The Mg content is preferably 7.0 mass % or more, and more preferably 8.0 mass % or more. The Mg content in such a range suppresses the formation of the Si-based slag owing to the Al—Mg-containing slag and improves the electrodeposition coating properties at the weld bead zone 30.

On the other hand, when the Mg content exceeds 30.0 mass %, the Al content consumed to form the Al—Mg-containing slag may be insufficient. As a result, the Al—Mg-containing slag is difficult to be formed on the surface of the weld metal 31 and the formation of the Si-based slag is difficult to suppress. Therefore, the Mg content in the slag layer 32 at the position A is required to be 30.0 mass % or less.

To identify the component of the slag layer 32, a cross-sectional SEM-EPMA (electron probe micro analyzer) measurement is performed at a position 1 mm (position A in FIG. 2) in a direction orthogonal to an extension direction (Y-axis direction in FIG. 2) of the weld bead zone 30 and in a direction (X-axis direction in FIG. 2) toward the inside of the weld bead zone 30 from the toe T, as illustrated in FIG. 2. The EPMA point composition analysis at this time can be used to measure a concentration of each element that forms the slag layer 32.

Although the chemical composition of the slag layer 32 is specified only at the position A as described above, when the Al—Mg-containing slag is formed at the position A, it is presumed that the Al—Mg-containing slag is formed not only at the position A but also in the vicinity of the position A. Therefore, when the chemical composition of the slag layer 32 at the position A satisfies the above chemical composition, the formation of the Si-based slag is suppressed also in the vicinity of the position A, and the electrodeposition coating properties of the weld bead zone 30 can be improved.

Al and Mg contained in the slag layer 32 at the position A are mainly diffused from the plating layer 103 having the Zn—Al—Mg-based alloy phase. Therefore, the welded joint 1 of this embodiment with excellent electrodeposition coating properties can be manufactured by using a plated steel sheet having such a plating layer 103 as a material for at least one of the first steel sheet 10 or the second steel sheet 20.

When a filler metal is used to weld the first steel sheet 10 and the second steel sheet 20, a suitable example of the filler metal is a solid wire. An example of a suitable chemical composition of the solid wire is, by mass %, C: 0.05 to 0.20%, Si: 0 to 0.15%, Mn: 0.3 to 2.5%, P: 0 to 0.02%, S: 0 to 0.04%, Ti: 0.02 to 0.20%, B: 0 to 0.012%, Al: 0 to 0.22%, Cr: 0 to 0.5%, Nb: 0 to 0.3%, V: 0 to 0.3%, Mo: 0 to 1.0%, Ni: 0 to 3.0%, Zr: 0 to 0.200%, Cu: 0 to 0.5% with the balance composed of Fe and impurities.

The features of the weld bead zone in the welded joint 1 of this embodiment are described in detail above with reference to FIG. 2.

The welded joint 1 of this embodiment has been described in detail. The welded joint 1 of this embodiment as explained above can be suitably used, for example, as automobile undercarriage parts.

Manufacturing Method of Plated Steel Sheet That Will Be Used as Material

Next, an example of a manufacturing method of the plated steel sheet to be a material of the welded joint 1 as described above will be described.

The plated steel sheet that will be used as the material of the welded joint 1 of this embodiment is manufactured by using the steel sheet composed of the base iron 101 as described above as a base material and forming the plating layer 103 and the oxide layer 105 on the surface of the base iron 101.

In addition to the hot-dip plating method, a thermal spraying method, cold spraying method, sputtering method, vapor deposition method, electroplating method, and other methods can be applied to form the plating layer 103. However, the hot-dip plating method is the most preferable in terms of cost to form a plating layer of a thickness generally used in automobiles and other vehicles.

Subsequently, the oxide layer 105 is formed on the surface of the plating layer 103 by applying a specific heat treatment process as described below to the resulting plated steel sheet (the plated steel sheet composed of the base iron 101 and the plating layer 103). The plated steel sheet used as the material of the welded joint 1 of this embodiment is thereby manufactured.

Hereinafter, an example of the manufacturing method for obtaining the plated steel sheet of this embodiment using the hot-dip plating method will be described in detail.

In the manufacturing process for the plated steel sheet, first, the steel sheet composed of the base iron 101 used as the base material is rolled by a Sendzimir method to a desired thickness, then coiled and installed in a hot-dip plating line.

In the hot-dip plating line, the steel sheet is continuously unrolled from coils and fed. At that time, the steel sheet is heated and reduced at 800° C. in an $N_2$-5% $H_2$ gas atmosphere in an annealing facility installed on the line, for example, in an environment with an oxygen concentration of 20 ppm or less to prevent oxidation. Thereafter, the sheet is air-cooled with $N_2$ gas to around a plating bath temperature +20° C., and then immersed in the plating bath at a subsequent stage.

Here, the plating bath should be prepared with a plating alloy in a molten state, having the chemical component as described above. The temperature of the plating bath should be the melting point of the plating alloy (for example, approximately 460 to 600° C.) or more. When preparing a material for the plating alloy, pure metal (purity of 99% or higher) is preferably used as the alloy material for the preparation. First, a predetermined amount of the alloy metal is mixed to obtain the composition of the plating layer as described above and completely melted into an alloy using a high-frequency induction furnace, arc furnace, or other furnaces under vacuum or inert gas replacement conditions. Furthermore, the alloy mixed with the predetermined component (composition of the above plating layer) is melted in air, and the resulting melt is used as the plating bath.

There is no particular restriction on using pure metals in the preparation of the plating alloys as described above, and existing Zn alloys, Mg alloys, and Al alloys may be melted and used. In this case, there is no problem as long as a predetermined composition alloy with few impurities is used.

After the steel sheet is immersed in the plating bath as described above, it is pulled up at a predetermined speed. At this time, a plating adhesion amount is controlled by $N_2$ wiping gas, for example, so that the plating layer 103 formed becomes the desired thickness. Other than the bath temperature, general plating operation conditions can be applied, and no special facilities or conditions are required.

Then, first and second cooling processes as described below are performed on the plating alloy in a molten state located on the steel sheet to make the plating alloy in the molten state into the plating layer 103 and to form the oxide layer 105 on the surface of the plating layer 103. The first and second cooling processes are described in detail below.

The first cooling process is a process, which is performed when the temperature of the plating alloy is in a range of the bath temperature or less and 250° C. or more. The plated steel sheet in the above temperature range is rapidly cooled at an average cooling rate of 10° C./second or more in an atmosphere with a dew point of −20° C. or less. When the hot-dip plating method is employed in the plating process, the first cooling process is performed immediately after the steel sheet is pulled up from the plating bath. This causes the plating alloy located on the surface of the steel sheet to solidify to form the plating layer.

Thereafter, when the temperature of the plating alloy (plating layer) is within a range of less than 250° C. and 50° C. or more, the second cooling process is performed. This second cooling process is a process in which the plated steel sheet within the temperature range of less than 250° C. and 50° C. or more is slowly cooled at an average cooling rate of less than 10° C./second in an atmosphere with a dew point of 0° C. or more. This controls a state of oxides formed on the surface of the plating layer to form a desired oxide layer.

As described above, the two-step cooling process of rapid cooling in the temperature range of the bath temperature or less and 250° C. or more and slow cooling in the temperature range of less than 250° C. and 50° C. or more allows the formation of the dense oxide layer 105 on the surface of the plating layer 103, which satisfies certain conditions in the XPS measurement result.

Here, an interval between an end of the first cooling process and a start of the second cooling process is preferably within 3 seconds, and the second cooling process is preferably started immediately after the end of the first cooling process. When the interval between the end of the first cooling process and the start of the second cooling process exceeds 3 seconds, an unintended cooling process occurs and the desired oxide layer 105 cannot be obtained.

Here, a lower limit value of the dew point is not specified in the above first cooling process, but approximately −90° C., for example, is the practical lower limit. The average cooling rate is more preferably 40° C./second or more. An upper limit value of the average cooling rate is not specified, but for example, approximately 90° C./second is the practical upper limit.

In the above second cooling process, an upper limit value of the dew point is not specified, but approximately 20° C., for example, is the practical upper limit. The average cooling rate is more preferably 4° C./second or less.

When either the first or second cooling process as described above is not performed, the desired oxide layer 105 cannot be obtained. By applying both the first and second cooling processes as described above, the oxide layer 105 of this embodiment can be obtained.

When an alloying heat treatment process (for example, a heat treatment process involving heating to an attained sheet temperature of approximately 480 to 550° C.), which is generally applied in the manufacture of alloyed hot-dip galvanized steel sheets, is applied after the second cooling process described above, an oxide formation state controlled by the first and second cooling processes is disrupted, resulting in excessive oxide growth. As a result, the Zn evaporation suppression effect focused on in this embodiment cannot be obtained. From this perspective, it is important not to perform the heat treatment process after the second cooling process.

For the above cooling treatment, generally known methods such as $N_2$ gas cooling, mist cooling, water submergence, and other methods can be applied. In addition to $N_2$ gas, other gases with high heat removal effects such as He gas and hydrogen gas may be used as the cooling gas.

For example, a contact-type thermocouple (K-type) can be used to actually measure the temperature of the plating layer. By attaching the contact-type thermocouple to the base material steel sheet, the average temperature of an entire plating layer can be constantly monitored. Also, by mechanically controlling various speeds and thicknesses, and by standardizing various operating conditions such as a preheating temperature of the steel sheet and the temperature of the hot-dip plating bath, the temperature of the entire plating layer at that point under such manufacturing conditions can be monitored almost accurately. This makes it possible to precisely control the cooling treatment in the first and second cooling processes. The surface temperature of the plating layer can also be measured by a non-contact radiation thermometer, although this is not as accurate as the contact type.

A relationship between the surface temperature of the plating layer and the average temperature of the entire plating layer may be determined by a simulation that performs heat conduction analysis. Concretely, the surface temperature of the plating layer and the average temperature of the entire plating layer are determined based on various manufacturing conditions, such as the preheating temperature of the steel sheet, the temperature of the hot-dip plating bath, the pulling-up speed of the steel sheet from the plating bath, the sheet thickness of the steel sheet, the layer thickness of the plating layer, an amount of heat exchange between the plating layer and the manufacturing facility, and a heat release amount of the plating layer. The obtained results can then be used to determine the relationship between the surface temperature of the plating layer and the average temperature of the entire plating layer. This makes it possible to estimate the average temperature of the entire plating layer at that time under the manufacturing conditions by actually measuring the surface temperature of the plating layer during the manufacturing of the plated steel sheet. As a result, the cooling treatment in the first and second cooling processes can be precisely controlled.

The above is the concrete description of the example of the manufacturing method for the plated steel sheet of this embodiment.

In the manufacturing method for the plated steel sheet of this embodiment, a further treatment to form one or two or more layers of various types of films may be implemented after the second cooling process described above. Such treatments include, for example, chromate treatment, phosphate treatment, chromate-free treatment, organic resin film formation treatment, and other treatments.

Examples of the chromate treatment include electrolytic chromate treatment, which forms a chromate film by electrolysis, reactive chromate treatment, which forms a film by reaction with a material and then washes off excess treatment solution, coating-type chromate treatment, which forms a film by applying a treatment solution and drying it without water washing, and other treatments. Any of these chromate treatments may be used.

Examples of the electrolytic chromate treatment include the electrolytic chromate treatment using, for example, chromic acid, silica sol, resin (phosphoric acid resin, acrylic resin, vinylester resin, vinyl acetate acrylic emulsion, carboxylated styrene butadiene latex, diisopropanolamine modified epoxy resin, and the like), and hard silica.

Examples of the phosphate treatment include, for example, zinc phosphate treatment, calcium zinc phosphate treatment, manganese phosphate treatment, and other treatments.

The chromate-free treatment is particularly suitable because it does not place a burden on the environment. Such chromate-free treatment includes electrolytic chromate-free treatment, which forms a chromate-free film by electrolysis, reactive chromate-free treatment, which forms a film by reaction with a material and then washes off excess treatment solution, coating-type chromate-free treatment, which forms a film by applying a treatment solution and drying it without water washing, and other treatments. Any of these chromate-free treatments may be used.

The organic resins used in the organic resin film formation treatment are not limited to specific resins. For example, various resins such as polyester resins, polyurethane resins, epoxy resins, acrylic resins, polyolefin resins, and modified versions of these resins can be used. The term "modified resins" refers to resins in which reactive functional groups in a structure of these resins are reacted with other compounds (for example, monomers, crosslinking agents, or other compounds) that contain functional groups, which can react with such functional groups, in the structure.

One of the above-mentioned organic resins may be used alone, or a mixture of two or more organic resins (not modified) may be used. One or two or more organic resins obtained by modifying at least one other organic resin in the presence of at least one organic resin may also be used in a mixture. In addition, an organic resin that has been made aqueous by dissolving or dispersing it in water may be used. Furthermore, various kinds of coloring pigments and anti-corrosion pigments may be contained in such organic resin films.

Manufacturing Method of Welded Joint

The welded joint of this embodiment is manufactured by using the plated steel sheet manufactured as described above as the material for at least one of the first steel sheet or the second steel sheet in manufacturing the welded joint, arranging the first and second steel sheets to be the shape required for the welded joint, and then welding the first and second steel sheets.

Here, an arc welding or laser welding method can be used to weld the first and second steel sheets. In this case, the state of the weld bead zone as described above can be achieved by welding under the welding conditions described below for each welding method.

In more detail, when welded joints are manufactured by the arc welding, for example, the first and second steel sheets should be welded according to the following welding conditions.

Welding current: 250 A, welding voltage: 26.4 V, welding speed: 100 cm/min.
Welding gas: 20% $CO_2$+Ar, gas flow rate: 20 L/min.
Welding wire: YGW16, φ1.2 mm, manufactured by Nippon Steel Welding & Engineering Co., Ltd.
(C: 0.1 mass %, Si: 0.80 mass %, Mn: 1.5 mass %, P: 0.015 mass %, S: 0.008 mass %, Cu: 0.36 mass %)
Inclination angle of welding torch: 45°

When manufacturing welded joints by the laser welding, for example, the first and second steel sheets should be welded according to the following welding conditions.

Output: 7 kW, welding speed: 400 cm/min, forward/backward angle: 0°

The above is an example of a manufacturing method for welded joints of this embodiment.

At first glance, it is conceivable to use various resistance welding methods such as a high-frequency resistance welding method and a resistance butt welding method as the welding methods, but when such welding methods are used, the weld bead zone state as focused on in this embodiment cannot be achieved.

EXAMPLES

Hereinafter, the welded joint according to the present invention will be concretely explained by showing examples and comparative examples. The examples shown below are only one example of the welded joint of this invention, and the welded joint of this invention is not limited to the examples shown below.

In the following examples and comparative examples, a hot-rolled steel sheet (0.05 mass % C-0.2 mass % Si-1.3 mass % Mn-0.12 mass % Ti-0.07 mass % Al, manufactured by Nippon Steel Corporation) of 2.6 mm thickness was used as the base material. The hot-rolled steel sheet was cut into a size of 100 mm×200 mm to be used as a specimen.

Plating baths to obtain plating layers with compositions as listed in Table 1 below were each prepared, and each was installed in a batch-type hot-dip plating test apparatus manufactured in-house, and the above specimens were plated. Here, the temperature of each specimen was measured using a thermocouple spot-welded to the center of each specimen. For each specimen to be immersed in the plating bath, a surface of a plated substrate was subjected to a heat-reduction treatment at 800° C. in an $N_2$-5% $H_2$ gas atmosphere in a furnace with the oxygen concentration of 20 ppm or less before immersion in the plating bath. After the heat-reduction treatment, each specimen was air-cooled with $N_2$ gas and immersed in the plating bath of the hot-dip plating test apparatus for about 3 seconds after the temperature of the specimen reached the bath temperature +20° C.

After the immersion in the plating bath, the specimen was pulled up at a pulling-up speed of 20 to 200 mm/second. At the time of pulling-up, $N_2$ wiping gas was used to control a desired plating adhesion amount. In the following examples and comparative examples, the plating adhesion amount was controlled so that the adhesion amount of the plating layer after drying per one side of the specimen was 15 to 250 g/m². After pulling up the specimen from the plating bath, the specimen was cooled from the plating bath temperature to room temperature under the conditions listed in Table 1 below. In the following examples and comparative examples, the second cooling process was started immediately after the end of the first cooling process (that is, the interval between the end of the first cooling process and the start of the second cooling process was 0.2 seconds or less).

The steel sheet was cut into a size of 30 mm×30 mm from the specimen plated as described above. The plated steel sheet was then immersed in a 10% HCl aqueous solution with an inhibitor added, and the plating layer was pickled and peeled off. The composition of the plating layer was measured by ICP analysis of the elements dissolved in the aqueous solution.

Electron diffraction images were taken of the obtained plating layer by TEM, and the presence of the $Mg_{32}(Al, Zn)_{49}$ phase was confirmed based on whether a five-fold symmetrical crystal structure was observed in the electron diffraction images.

Furthermore, the XPS spectrum of the obtained oxide layer was measured in accordance with the method described above, and the value of the intensity ratio ([Al—O]+[Mg—O])/[Zn—O] was calculated. The obtained intensity ratios were evaluated based on the following criteria.

«Evaluation Criteria»

Grade "A": Value of intensity ratio of 10.0 or more
"B": Value of intensity ratio of 5.0 or more and less than 10.0
"C": Value of intensity ratio of less than 5.0

From the obtained specimen, a first steel sheet was cut into a size of 150 mm×50 mm, and a second steel sheet was cut into a size of 150 mm×30 mm. Long sides of these steel sheets were overlapped and welded by arc welding or laser welding (lap fillet welding) to be a welded joint.

Here, welding conditions for the arc welding are as follows.

Welding Mode: Pulsed arc MAG welding
Welding current: 230 A, welding voltage: 23.4 V, welding speed: 100 cm/min.
Welding gas: 20% $CO_2$+Ar, gas flow rate: 20 L/min.
Welding wire: YM-TX, φ1.2 mm, manufactured by Nippon Steel Welding & Engineering Co., Ltd.
(C: 0.11 mass %, Si: 0.01 mass %, Mn: 1.21 mass %, P: 0.006 mass %, S: 0.007 mass %, Cu: 0.22 mass %)
Inclination angle of welding torch: 60°
Overlap allowance: 10 mm
Steel sheet size: Upper sheet side (first steel sheet) 150×50 mm, lower sheet side (second steel sheet) 150×30 mm
Gap between steel sheets: 0 mm
Contact tip distance: 15 mm
Welding conditions for the laser welding are as follows.
Output: 7 kW, welding speed: 400 cm/min, forward/backward angle: 0°
Steel sheet size: Upper sheet side (first steel sheet) 150×50 mm, lower sheet side (second steel sheet) 150×30 mm
Overlap allowance: 50 mm
Gap between steel sheets: 0 mm <Electrodeposition Coating Properties of Weld Bead Zone>

Figure 6:
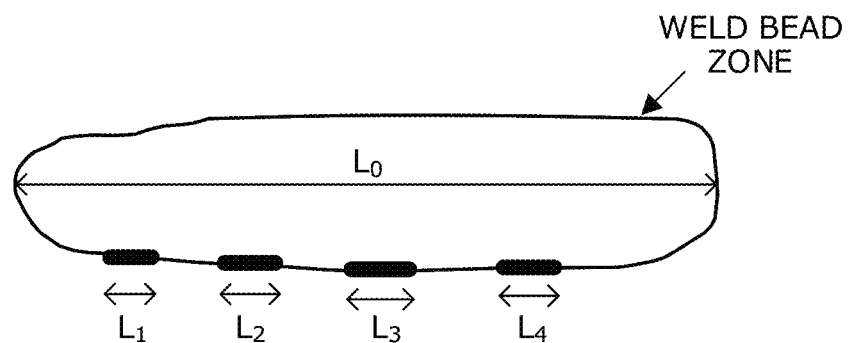
FIG. 6 is an explanatory diagram to explain an evaluation method of electrodeposition coating properties.

The welded joints obtained as described above were treated with automotive phosphate conversion treatment (Zn phosphatization, SD5350 system: Nippon Paint Industrial Coding Co. Ltd. standard) and electrodeposition coating (PN110 Power Nix Gray: Nippon Paint Industrial Coding Co., Ltd. standard) were applied. A thickness of the electrodeposition coating was 20 μm. As illustrated in FIG. 6, a maximum length $L_0$ in the extension direction of the weld bead zone and lengths $L_n$ (n: an integer of 1 or more) of electrodeposition failure areas that occurred on the sample were measured for the sample after the electrodeposition coating. The electrodeposition failure area is reddish brown to black in appearance, which is different in color from the color of the electrodeposition coating area, so the electrodeposition failure area can be identified from the appearance. In other words, the length of each electrodeposition failure area identified from the appearance in a direction parallel to the extension direction of the weld bead zone (welding direction) is the length $L_n$ of the electrodeposition failure area.

The electrodeposition coating properties were then evaluated by calculating a ratio of a total length of the electrodeposition failure areas, $\Sigma L_n$, to the maximum length of the weld bead zone, $L_0$ ($\Sigma L_n/L_0$). The evaluation criteria are as follows. The results obtained are summarized in Table 1 below.

<<Evaluation Criteria>>

Grade "AAA": The value of $\Sigma L_n/L_0$ of 0.3 or less
"AA": The value of $\Sigma L_n/L_0$ of more than 0.3 and 0.5 or less
"A": The value of $\Sigma L_n/L_0$ of more than 0.5 and 0.7 or less
"B": The value of $\Sigma L_n/L_0$ of more than 0.7

TABLE 1

| | | PLATING LAYER MANUFACTURING CONDITION | | | | | | | | | |
| | | BATH | FIRST COOLING PROCESS | | SECOND COOLING PROCESS | | | | | | |
| | | TEMPER-ATURE | COOLING RATE | DEW POINT | COOLING RATE | DEW POINT | WELDING | COMPOSITION OF PLATING LAYER IN NON-HEAT-AFFECTED ZONE (mass %) | | | |
| No | CATEGORY | (° C.) | (° C./s) | (° C.) | (° C./s) | (° C.) | METHOD | Zn | Al | Mg | Si | Ca |
| 1 | EXAMPLE | 450 | 15 | −40 | 5 | 0 | ARC | 97.900 | 1.0 | 1.0 | 0.0 | 0.0 |
| 2 | EXAMPLE | 450 | 15 | −40 | 5 | 0 | ARC | 96.520 | 1.8 | 1.5 | 0.0 | 0.0 |
| 3 | EXAMPLE | 450 | 15 | −40 | 5 | 0 | ARC | 95.199 | 2.2 | 2.5 | 0.0 | 0.0 |
| 4 | EXAMPLE | 420 | 15 | −40 | 5 | 0 | LASER | 94.900 | 3.0 | 2.0 | 0.0 | 0.0 |
| 5 | EXAMPLE | 430 | 15 | −40 | 5 | 0 | ARC | 90.900 | 6.0 | 3.0 | 0.0 | 0.0 |
| 6 | EXAMPLE | 450 | 15 | −40 | 5 | 0 | ARC | 85.320 | 11.0 | 3.4 | 0.2 | 0.0 |
| 7 | EXAMPLE | 500 | 15 | −40 | 5 | 0 | ARC | 82.300 | 11.5 | 6.0 | 0.0 | 0.1 |
| 8 | EXAMPLE | 500 | 15 | −40 | 5 | 0 | ARC | 75.280 | 18.0 | 6.5 | 0.0 | 0.1 |
| 9 | EXAMPLE | 500 | 15 | −40 | 5 | 0 | LASER | 73.090 | 19.6 | 7.0 | 0.0 | 0.1 |
| 10 | EXAMPLE | 500 | 15 | −40 | 5 | 0 | ARC | 72.600 | 20.0 | 7.2 | 0.0 | 0.1 |
| 11 | EXAMPLE | 540 | 15 | −40 | 5 | 0 | ARC | 70.997 | 25.4 | 3.4 | 0.0 | 0.1 |
| 12 | EXAMPLE | 540 | 15 | −40 | 5 | 0 | ARC | 59.880 | 25.1 | 14.0 | 0.0 | 0.8 |

TABLE 1-continued

| No | | | | | | | | | | | |
|---|---|---|---|---|---|---|---|---|---|---|---|
| 13 | EXAMPLE | 570 | 15 | −40 | 5 | 0 | ARC | 60.490 | 29.9 | 8.0 | 0.0 | 0.1 |
| 14 | EXAMPLE | 540 | 15 | −40 | 5 | 10 | ARC | 57.897 | 30.1 | 9.0 | 0.0 | 0.6 |
| 15 | EXAMPLE | 570 | 15 | −40 | 5 | 10 | ARC | 40.799 | 35.0 | 20.0 | 0.0 | 2.6 |
| 16 | EXAMPLE | 560 | 15 | −40 | 5 | 0 | ARC | 53.490 | 35.7 | 7.0 | 0.2 | 0.2 |
| 17 | EXAMPLE | 560 | 15 | −40 | 5 | 0 | LASER | 49.290 | 35.8 | 9.2 | 0.4 | 0.5 |
| 18 | EXAMPLE | 570 | 15 | −40 | 5 | 0 | ARC | 42.200 | 40.0 | 11.2 | 0.5 | 1.0 |
| 19 | EXAMPLE | 580 | 15 | −40 | 5 | 0 | ARC | 35.098 | 40.3 | 15.6 | 1.0 | 2.5 |
| 20 | EXAMPLE | 580 | 15 | −40 | 5 | 0 | ARC | 36.400 | 45.0 | 11.9 | 0.6 | 1.0 |
| 21 | EXAMPLE | 580 | 15 | −40 | 5 | 0 | ARC | 40.495 | 46.0 | 6.4 | 0.0 | 0.0 |
| 22 | EXAMPLE | 640 | 15 | −40 | 5 | 0 | ARC | 30.099 | 47.0 | 15.0 | 0.8 | 4.0 |
| 23 | EXAMPLE | 600 | 15 | −40 | 5 | 0 | ARC | 35.400 | 50.4 | 8.6 | 0.8 | 0.2 |
| 24 | EXAMPLE | 600 | 15 | −40 | 5 | 0 | ARC | 31.080 | 54.1 | 8.0 | 1.2 | 0.2 |
| 25 | EXAMPLE | 620 | 15 | −40 | 5 | 0 | ARC | 29.400 | 58.0 | 6.8 | 1.5 | 0.1 |
| 26 | EXAMPLE | 650 | 15 | −40 | 5 | 0 | ARC | 24.750 | 60.4 | 7.3 | 2.0 | 0.1 |
| 27 | EXAMPLE | 660 | 15 | −40 | 5 | 0 | ARC | 10.580 | 65.8 | 11.0 | 6.0 | 0.1 |
| 28 | EXAMPLE | 660 | 15 | −40 | 5 | 0 | ARC | 8.800 | 70.4 | 1.4 | 10.0 | 0.7 |
| 29 | EXAMPLE | 670 | 15 | −40 | 5 | 0 | ARC | 6.180 | 74.9 | 2.4 | 9.0 | 0.7 |
| 30 | EXAMPLE | 670 | 15 | −40 | 5 | 0 | ARC | 6.190 | 75.5 | 3.2 | 7.4 | 0.6 |
| 31 | EXAMPLE | 680 | 15 | −40 | 5 | 0 | LASER | 5.000 | 80.0 | 2.1 | 4.0 | 0.4 |
| 32 | COMPARATIVE EXAMPLE | 450 | 15 | −40 | 5 | 0 | ARC | 97.900 | 0.5 | 1.5 | 0.0 | 0.0 |
| 33 | COMPARATIVE EXAMPLE | 680 | 15 | −40 | 5 | 0 | ARC | 2.900 | 81.0 | 7.2 | 0.0 | 0.1 |
| 34 | COMPARATIVE EXAMPLE | 570 | 15 | −40 | 5 | 0 | ARC | 53.300 | 40.0 | 0.6 | 0.0 | 1.0 |
| 35 | COMPARATIVE EXAMPLE | 580 | 15 | −40 | 5 | 0 | ARC | 70.400 | 2.0 | 21.5 | 0.0 | 1.0 |
| 36 | COMPARATIVE EXAMPLE | 700 | 15 | −40 | 5 | 0 | ARC | 5.500 | 70.0 | 8.6 | 11.2 | 0.2 |
| 37 | COMPARATIVE EXAMPLE | 670 | 15 | −40 | 5 | 0 | ARC | 11.000 | 74.9 | 2.8 | 0.0 | 4.5 |
| 38 | COMPARATIVE EXAMPLE | 670 | 5 | −40 | 5 | 0 | ARC | 87.900 | 2.5 | 2.8 | 0.0 | 0.0 |
| 39 | COMPARATIVE EXAMPLE | 500 | 15 | 0 | 5 | 0 | ARC | 94.300 | 4.2 | 1.3 | 0.0 | 0.1 |
| 40 | COMPARATIVE EXAMPLE | 570 | 15 | −40 | 15 | 0 | ARC | 88.800 | 3.0 | 2.1 | 0.0 | 1.0 |
| 41 | COMPARATIVE EXAMPLE | 500 | 15 | −40 | 5 | −40 | ARC | 96.700 | 1.0 | 2.1 | 0.0 | 0.1 |

| | COMPOSITION OF PLATING LAYER IN NON-HEAT-AFFECTED ZONE (mass %) | | NON-HEAT-AFFECTED ZONE | | PLATING LAYER | SLAG | | |
|---|---|---|---|---|---|---|---|---|
| | OTHERS | | PLATING ADHESION | OXIDE LAYER XPS | PREENCE/ABSENCE OF | COMPOSITION OF WELD BEAD ZONE | | ELECTRO DEPOSITION |
| | | | AMOUNT | INTENSITY | QUASI- | (mass %) | | COATING |
| No | Fe | COMPO-SITION | KIND | (g/m²) | RATIO | CRYSTAL | Al | Mg | PROPERTIES |
| 1 | 0.1 | — | — | 45 | B | ABSENT | 1.0 | 1.0 | A |
| 2 | 0.1 | 0.080 | Sb | 15 | B | ABSENT | 3.0 | 1.0 | A |
| 3 | 0.1 | 0.001 | Li | 45 | B | ABSENT | 7.0 | 2.0 | A |
| 4 | 0.1 | — | — | 50 | B | ABSENT | 5.0 | 3.0 | A |
| 5 | 0.1 | — | — | 45 | B | ABSENT | 11.0 | 3.0 | A |
| 6 | 0.1 | 0.030 | Sr | 45 | B | ABSENT | 13.0 | 4.0 | A |
| 7 | 0.1 | — | — | 45 | B | ABSENT | 14.0 | 5.0 | A |
| 8 | 0.1 | 0.020 | Pb | 45 | A | ABSENT | 15.0 | 7.0 | AA |
| 9 | 0.2 | 0.010 | Sn | 60 | A | ABSENT | 18.0 | 8.0 | AA |
| 10 | 0.1 | — | — | 45 | A | ABSENT | 18.0 | 3.0 | AA |
| 11 | 0.1 | 0.003 | B | 45 | B | ABSENT | 20.0 | 4.0 | A |
| 12 | 0.2 | 0.020 | Nb | 45 | A | ABSENT | 24.0 | 27.0 | AA |
| 13 | 1.5 | 0.010 | Co | 45 | A | ABSENT | 27.0 | 13.0 | AA |
| 14 | 2.4 | 0.003 | V | 250 | A | ABSENT | 30.0 | 14.0 | AA |
| 15 | 1.6 | 0.001 | Ni | 45 | A | PRESENT | 31.0 | 30.0 | AAA |
| 16 | 3.4 | 0.010 | Ti | 55 | A | PRESENT | 32.0 | 8.0 | AAA |
| 17 | 4.8 | 0.010 | Zr | 45 | A | PRESENT | 34.0 | 9.0 | AAA |
| 18 | 5.1 | — | — | 180 | A | PRESENT | 35.0 | 18.0 | AAA |
| 19 | 5.5 | 0.002 | In | 45 | A | PRESENT | 38.0 | 22.0 | AAA |
| 20 | 5.1 | — | — | 45 | A | PRESENT | 38.0 | 18.0 | AAA |
| 21 | 7.1 | 0.005 | Bi | 120 | A | ABSENT | 37.0 | 7.0 | AA |
| 22 | 3.1 | 0.001 | Ag | 45 | A | PRESENT | 40.0 | 24.0 | AAA |
| 23 | 4.5 | 0.100 | Cu | 110 | A | PRESENT | 41.0 | 10.0 | AAA |
| 24 | 5.4 | 0.020 | Y | 90 | A | PRESENT | 40.0 | 9.0 | AAA |
| 25 | 4.2 | — | — | 45 | A | ABSENT | 41.0 | 7.0 | AA |
| 26 | 5.4 | 0.050 | Cr | 45 | A | PRESENT | 41.0 | 8.0 | AAA |
| 27 | 6.5 | 0.020 | Mn | 80 | A | PRESENT | 40.0 | 14.0 | AAA |
| 28 | 8.7 | — | — | 45 | B | ABSENT | 42.0 | 1.0 | A |
| 29 | 6.8 | 0.020 | La:Ce = | 45 | B | ABSENT | 44.0 | 2.0 | A |

TABLE 1-continued

| | | | 1:1 | | | | | | |
|---|---|---|---|---|---|---|---|---|---|
| 30 | 7.1 | 0.010 | Mo | 25 | B | ABSENT | 44.0 | 3.0 | A |
| 31 | 8.5 | — | — | 45 | B | ABSENT | 45.0 | 2.0 | A |
| 32 | 0.1 | — | — | 45 | C | ABSENT | 0.5 | 1.0 | B |
| 33 | 8.8 | — | — | 55 | C | ABSENT | 47.0 | 0.1 | B |
| 34 | 5.1 | — | — | 45 | C | ABSENT | 41.0 | 0.8 | B |
| 35 | 5.1 | — | — | 45 | C | ABSENT | 0.8 | 17.0 | B |
| 36 | 4.5 | — | — | 65 | C | ABSENT | 0.8 | 0.4 | B |
| 37 | 6.8 | — | — | 45 | C | ABSENT | 0.8 | 0.4 | B |
| 38 | 6.8 | — | — | 45 | C | ABSENT | 0.5 | 0.6 | B |
| 39 | 0.1 | — | — | 45 | C | ABSENT | 0.5 | 0.6 | B |
| 40 | 5.1 | — | — | 45 | C | ABSENT | 0.8 | 0.7 | B |
| 41 | 0.1 | — | — | 45 | C | ABSENT | 0.7 | 0.5 | B |

As it is clear from Table 1 above, examples corresponding to the examples of the present invention exhibit excellent electrodeposition coating properties in the weld bead zone, whereas examples corresponding to the comparative examples of the present invention do not achieve sufficient performance in terms of electrodeposition coating properties in the weld bead zone.

Preferred embodiments of the present invention have been described above in detail with reference to the attached drawings, but the present invention is not limited to the embodiments. It should be understood that various changes and modifications are readily apparent to those skilled in the art who have the common general knowledge in the technical field to which the present invention pertains, within the scope of the technical spirit as set forth in claims, and they should also be covered by the technical scope of the present invention.

EXPLANATION OF CODES

1 welded joint
10 first steel sheet
20 second steel sheet
30 weld bead zone
31 weld metal
32 slag layer
101 base iron
103 plating layer
105 oxide layer

What is claimed is:

1. A welded joint in which a first steel sheet and a second steel sheet are welded by arc welding or laser welding, the welded joint comprising:
    the first steel sheet and the second steel sheet; and
    a weld bead zone formed by the arc welding or laser welding, wherein
    when a zone, which is not affected by heat due to the welding, is defined as a non-heat-affected zone in the first steel sheet and the second steel sheet, at least one of the first steel sheet or the second steel sheet has a plating layer located on at least part of a surface of a base iron and an oxide layer located on the plating layer in the non-heat-affected zone, the plating layer contains: by mass %,
    Al: 1.00 to 80.00%;
    Mg: 1.00 to 20.00%;
    Fe: 0.01 to 15.00%;
    Si: 0 to 10.00%;
    Ca: 0 to 4.00%, and further selectively contains 0 to 5.000% in total of:
    Sb: 0 to 0.500%;
    Pb: 0 to 0.500%;
    Cu: 0 to 1.000%;
    Sn: 0 to 1.000%;
    In: 0 to 1.000%;
    Bi: 0 to 1.000%;
    Ti: 0 to 1.000%;
    Cr: 0 to 1.000%;
    Nb: 0 to 1.000%;
    Zr: 0 to 1.000%;
    Ni: 0 to 1.000%;
    Mn: 0 to 1.000%;
    V: 0 to 1.000%;
    Mo: 0 to 1.000%;
    Ag: 0 to 1.000%;
    Li: 0 to 1.000%;
    La: 0 to 0.500%;
    Ce: 0 to 0.500%;
    B: 0 to 0.500%;
    Y: 0 to 0.500%;
    Sr: 0 to 0.500%, with the balance composed of 5.00 mass % or more Zn and impurities, wherein
    the oxide layer contains a total of 50 mass % or more of one or more of Zn oxide, Mg oxide, and Al oxide,
    the weld bead zone has a weld metal and a slag layer formed on part of a surface of the weld metal, and
    when Al and Mg are detected elements in the slag layer, the slag layer comprising multiple oxides of Al and Mg, the slag layer contains, by mass %:
    Al: 1.0 to 45.0% and
    Mg: 1.0 to 30.0%
    with the balance composed of Fe, easily oxidizable metallic elements, and impurities.

2. The welded joint according to claim 1, wherein the slag layer contains, by mass %
    Al: 15.0 to 45.0%, and
    Mg: 7.0 to 30.0%.

3. The welded joint according to claim 1, wherein when a position at a depth of 5 nm from an uppermost surface of the oxide layer is observed by X-ray photoelectron spectroscopy (XPS), a value of an intensity ratio ([Al—O]+[Mg—O])/[Zn—O]) calculated from intensity of peaks respectively attributed to an Al—O bond, an Mg—O bond, and a Zn—O bond is 5.0 or more.

4. The welded joint according to claim 3, wherein
    the value of the intensity ratio ([Al—O]+[Mg—O])/[Zn—O] is 10.0 or more.

5. The welded joint according to claim 1, wherein the plating layer in the non-heat-affected zone contains at least
    Al: 18.00 to 60.00 mass %, and
    Mg: 5.00 to 15.00 mass %.

6. The welded joint according to claim 1, wherein the plating layer in the non-heat-affected zone contains at least
    Al: 35.00 to 60.00 mass %, and Mg: 7.00 to 15.00 mass %, and an $Mg_{32}(Al, Zn)_{49}$ phase is present in the plating layer, an Mg content [Mg], Zn content [Zn], and Al content [Al] (each unit: atom %) in the $Mg_{32}(Al, Zn)_{49}$ phase satisfy the relationship of $0.50 \leq [Mg]/([Zn]+[Al]) \leq 0.83$.

7. A welded joint in which a first steel sheet and a second steel sheet are welded by arc welding or laser welding, the welded joint comprising:

the first steel sheet and the second steel sheet; and a weld bead zone formed by the arc welding or laser welding, wherein when a zone, which is not affected by heat due to the welding, is defined as a non-heat-affected zone in the first steel sheet and the second steel sheet, at least one of the first steel sheet or the second steel sheet has a plating layer located on at least part of a surface of a base iron and an oxide layer located on the plating layer in the non-heat-affected zone, the plating layer contains: by mass %, Al: 1.00 to 80.00%;
Mg: 1.00 to 20.00%;
Fe: 0.01 to 15.00%;
Si: 0 to 10.00%;
Ca: 0 to 4.00%, and further selectively contains 0 to 5.000% in total of:
Sb: 0 to 0.500%;
Pb: 0 to 0.500%;
Cu: 0 to 1.000%;
Sn: 0 to 1.000%;
In: 0 to 1.000%;
Bi: 0 to 1.000%;
Ti: 0 to 1.000%;
Cr: 0 to 1.000%;
Nb: 0 to 1.000%;
Zr: 0 to 1.000%;
Ni: 0 to 1.000%;
Mn: 0 to 1.000%;
V: 0 to 1.000%;
Mo: 0 to 1.000%;
Ag: 0 to 1.000%;
Li: 0 to 1.000%;
La: 0 to 0.500%;
Ce: 0 to 0.500%;
B: 0 to 0.500%;
Y: 0 to 0.500%;
Sr: 0 to 0.500%, with the balance composed of 5.00 mass % or more Zn and impurities, wherein the oxide layer contains a total of 50 mass % or more of one or more of Zn oxide, Mg oxide, and Al oxide, the weld bead zone has a weld metal and a slag layer formed on part of a surface of the weld metal, and when Al and Mg are detected elements in the slag layer, the slag layer comprising multiple oxides of Al and Mg, the slag layer contains, by mass %:

Al: 1.0 to 45.0% and
Mg: 1.0 to 30.0% with the balance comprising Fe, easily oxidizable metallic elements, and impurities.

* * * * *